UNITED STATES PATENT OFFICE.

DAVID T. DAY, OF WASHINGTON, DISTRICT OF COLUMBIA.

PROCESS FOR TREATING ASPHALTUM TO MAKE VARNISH.

967,337. Specification of Letters Patent. Patented Aug. 16, 1910.

No Drawing. Application filed April 18, 1906, Serial No. 312,325. Renewed January 8, 1910. Serial No. 537,090.

*To all whom it may concern:*

Be it known that I, DAVID T. DAY, a citizen of the United States, residing at Washington, in the District of Columbia, have invented certain new and useful Improvements in Processes of Treating Asphaltum to Make Varnish, of which the following is a specification.

This invention relates to the process of treating various forms of asphaltum to obtain valuable products.

The object of my invention is to provide for obtaining from ground or liquid asphaltum certain elastic nitrogenous bodies, adapted to form, by the addition of a suitable solvent, an elastic varnish, which may be effectively used as a substitute for shellac varnish, or other varnish.

I have found by experiment that when finely ground gilsonite, or grahamite, or albertite, or other forms of ground or liquid asphaltum, or asphaltum from petroleum are carefully treated with nitric acid, the product is divided into a portion heavier than water and a portion lighter than water. The portion heavier than water, after being suitably washed and dried and dissolved in alcohol, ether, benzol, benzin, or other similar solvents, leave on evaporation of the solvent a very smooth, elastic varnish, adapted for use as a substitute for shellac varnish and other spirit varnishes.

Into a nitric acid bath is gently poured liquid, or finely ground asphaltum, stirring meanwhile, and the addition is continued so long as there is sufficient strength left in the acid to attack the asphaltum. Care is taken to avoid a high elevation of temperature: this may safely rise to the boiling point of nitric acid, provided the acid be in excess. By this operation, part of the asphaltum is converted into nitroproducts which remain in solution in the acid while that part which is not converted remains on top of the acid and is drawn off therefrom for subsequent treatment. The acid containing in solution the nitroproducts desired is poured into cold water and is so diluted as to cause it to deposit such nitroproducts. Most of the products so deposited sink to the bottom of the water, while a part floats on the water. The heavy portion, sinking to the bottom is then repeatedly washed with water until all trace of nitric acid is removed and the product is then dried in any well known manner. The dried product, thus obtained, may be dissolved in alcohol, ether, benzol, naphtha or other suitable solvent, thereby forming an elastic varnish suitable for immediate application.

In the above process that portion which floats on the top of the acid after the described treatment may be separately treated with nitric acid and the heavy portion dissolved in the acid treated as above described for the production of nitro-products. The nitro-products obtained are insoluble in water and are heavier than water.

By dissolving the dried nitro-products in one of the above mentioned solvents a very smooth, elastic varnish is obtained, which is a suitable substitute for shellac varnish, or other spirit varnish.

Having described my invention, what I claim, and desire to secure by Letters Patent, is,—

1. The process of preparing nitroproducts from asphaltum which consists in mixing asphaltum with nitric acid, thereby making a nitroproduct solution of part of the asphaltum, drawing off the lighter undissolved portion, then diluting the nitroproduct solution with water, causing deposit of the resulting nitroproduct held in solution, then washing out the contained acid and drying the nitroproduct.

2. The process of preparing nitroproducts adapted for making varnish, which consists in dissolving asphaltum in nitric acid, separating the light surface oil from the solution, diluting the solution with water, thereby causing deposit of the contained nitroproducts, then washing to remove acid and drying such products, then dissolving the dried product in a suitable solvent to make a varnish.

In testimony whereof I affix my signature in presence of two witnesses.

DAVID T. DAY. [L. S.]

Witnesses:
 ALTHA T. COONS,
 ELIZABETH A. BALLOCH.